Patented Sept. 30, 1924.

1,510,259

UNITED STATES PATENT OFFICE.

LLOYD W. CYRENIUS, OF NEW YORK, N. Y.

MEDICINAL PREPARATION AND PROCESS OF MAKING THE SAME.

No Drawing.   Application filed October 30, 1919.   Serial No. 334,417.

*To all whom it may concern:*

Be it known that I, LLOYD W. CYRENIUS, a citizen of the United States, and resident of the borough of the Bronx, in the city, county, and State of New York, have invented certain new and useful Improvements in Medicinal Preparations and Processes of Making the Same, of which the following is a specification.

This relates to methods and products whereby toxic and potent agents, remedies, chemicals, may be administered hypodermically or intramuscularly in such form as to provide for sustained, slow, complete, yet retarded absorption. Heretofore all water soluble medicaments have been injected into the body in solutions in water with the result that the influence of the drug has been immediate, absorption taking place at once. While this is very desirable in some instances, as for instance, morphine to act in a sudden manner for the relief of pain, in other conditions the disadvantages are many as for instance, where a drug is to be used over considerable periods of time for its continued action, tonic or otherwise. This procedure makes necessary that the patient so treated must submit to very frequent treatments (injections), sometimes one or more times a day, causing much loss of time to himself, his physician, and at much expense. Again many of the drugs used in water solutions are extremely painful, irritating and corrosive, so that treatment must be discontinued due to soreness, pain, etc., at a period when the drug is most needed.

To overcome these and many other disadvantageous features of the methods heretofore used, my invention proposes an entirely novel method, an exemplification of which will be now described.

I mix bichloride of mercury, camphor, carbolic acid, and a hard vegetable fat together, with the aid of heat, and in this I proportion the constituents as follows; one part of bichloride to sixteen parts of camphor and carbolic acid, the camphor and carbolic being in equal parts. The solution of bichloride, camphor, and carbolic acid then is then mixed with the hard vegetable fat and in this the proportions are 4/9 solution and 5/9 fat. This is then thoroughly mixed, and allowed to stand. It will gradually become semi-solid. Then I mix separately bichloride and glycerine, taking 15 parts of bichloride and thirty parts of glycerine, and mix this solution with a soft fat, which has about the consistency of butter or lard. The quantity of soft fat depends on the strength of the bichloride, desired in the end product. The bichloride, glycerine and soft fat mixture is then thoroughly emulsified. The first mixture of bichloride, camphor, carbolic acid and hard fat is then thoroughly mixed with the second emulsion of bichloride, glycerine, and soft fat, and when this thorough mixing has been completed, with the fat carrying the bichloride in soluble form evenly distributed and incapable of separating, the product is ready for its medical uses. In this the bichloride is in solution or soluble condition and acts as the active agent, the camphor as a local anesthetic and the carbolic acid acts also as a local anesthetic. The glycerine acts as a solvent for the bichloride. The fat acts as the vehicle and in entering the muscular tissues of the bodies, it holds back the absorption of the bichloride thus incorporated. This is, due to the thorough emulsion of the bichloride and fat, the bichloride is absorbed by the body co-equally with the fat, and thus an even absorption is produced. Microscopically the finished product shows no crystals of the bichloride, and so it in its soluble state is absorbed by the body with the fat. It will also be seen that the fat acts to retard the absorption. That is if undisolved bichloride be administered, the crystals would produce a strong erosive and corrosive action on the muscles and veins, whereas in the solution formed, the bichloride is absorbed into or by the body no quicker than the fat is absorbed and in evenly divided condition, so that a very gradual taking up of the active agent or bichloride in the blood results.

The hard fat just referred to is a neutral vegetable fat, as for instance hydrogenated cotton seed oil free from free fatty acids, and has a high melting point; while the emulsion of the active agent, camphor and carbolic acid, in liquid state depresses the melting point, the mixing of the carbolic and camphor with a hard fat of a higher melting point, thereby reduces the melting point desired.

It will thus be seen that the bichloride in solution is held in a retarding menstrum, when applications are made, and thereby the soluble bichloride is retarded in its absorption in the human body. The amounts to be administered depend upon the fat but in general 1 grain of bichloride requires not more than 16 grs. (apothecary) of the vehicle fat. In application, 1 cc. of mass, has ¼, ½ or 1 grain of bichloride. The bichloride held thus in permanent emulsion with the vehicle fat, is uniformly distributed therein, in its dissolved state, and may be efficiently administered.

By means of the emulsion of a hard fat, or neutral hydrogenated fat and a solution of bichloride carried therein and thereby, as described, the active agent or toxic substance is so incorporated as to provide when injected into the muscle a slow or retarded absorption, so that very much larger doses or amounts may be used and injections made very much less frequent. In some instances 4 or 8 times ordinary doses have been given. The fat is absorbed in the same relation as the drug. The fat when injected into the muscles is split up by the fat splitting ferment lipase and alkaline juices of the muscle, into alkaline salts of fatty acids and glycerin, this action taking place gradually and slowly so that the drug is in turn available for absorption.

Instead of bichloride of mercury, other soluble active agents or potent drugs may be used in this manner, with the idea of their absorption being retarded, and a systemic effect sustained. Such drugs might be strychnia, arsenic, iron salts, animal substances, as for instance, pituitary gland substances. These are mixed and emulsified as above described.

In the case of strychnia, I mix it with a soft fat in the proportion of one part of strychnia to 375 parts of soft fat and add a local anæsthetic that is desirous for local application, as for instance carbolic acid or novocain. In the case of arsenic, I mix it with the soft fat, and with a local anæsthetic. In the case of iron salts, I dissolve these in glycerine, and add this solution to soft fat and add an anæsthetic. In the case of animal substances, this is mixed in considerable proportions with soft fat and with the local anæsthetic and is applied as herein described.

As an embodiment of a modified form of my invention, I finely powder the soluble drug, and then emulsify this finely powdered drug with a fat absorbable by the human body, in which the fat becomes thoroughly intermingled therewith. Bichloride of mercury, strychnine or its salts, arsenic or its salts, quinine or its salts or iron or its salts, can be thus finely powdered and emulsified with a fat. In summer, or in warmer climates, I use a hard fat, and in winter, or cooler climates, I use a softer fat; such fats being selected by their melting points. When this emulsion of powdered soluble drug and fat is injected, the fat acts as a retarding agent against the absorption of the soluble drug by the human body to enable the body to draw on it by systemic absorption. The juices of the muscles and the blood take into solution the soluble drug in a ratio proportionate to the absorption of the fat. The soluble drug is not absorbed any quicker, so in this sense, the fat acts as a retarder. Were it not for the fat, the soluble drug would be immediately absorbed, and of course, an overdose would result. The difficulty of administering a soluble drug has thereby been overcome. This difficulty is inherent in a soluble drug, and not in an insoluble drug, and the problem of administering a soluble drug, has thus been brought to solution, and it may thus be efficaciously administered, whereas a bichloride of mercury can only be administered in about ⅙ to ½ grain in aqueous solution by body injection, by applying the above described invention, eight to twelve times this amount may be given in one application without injuring the patient. In case of a soluble salt with any fat, 2 to 16 times this amount given in an aqueous solution may be given.

The bichloride of mercury is powdered into a very fine pulverized form so as to render the same impalpable without any larger particles substantially homogeneous. This finely pulverized or powdered drug is then homogenized with a fat absorbable by the tissues of the human body, by which homogenization, which is carried out by the use of a machine for homogenizing, the powdered drug is thoroughly merged with the fat globules. These fat globules with the drug homogenized therein, may then be readily absorbed by the tissues of the muscles and blood of the human body, and it becomes clear that the rate of absorption of the drug is proportionate to that of the fat. It is not quicker than the separate fat globules; and in this sense, again, the fat globules retard a too rapid absorption of the drug.

Animal fat may be used, provided it is neutral and absorbable.

I have described one preferred mode of carrying out my invention but modifications may be made therein in the local anæsthetics and active agents or drugs and means of bringing about the vehicle action of the neutral fat with bichloride, and my invention contemplates broadly the carrying of the bichloride in a vehicle fat, in which the bichloride is in solution whereby the fat acts as a retarder to absorption in the human body.

I claim as new and desire to secure Letters Patent:

1. The process of making a medicament for the treatment of diseases, consisting in mixing a water soluble mercury compound with a local anæsthetic, and a soft fat, then emulsifying a water soluble compound with a solvent and a hard fat, and then emulsifying the emulsion with the mixture.

2. The process of making a medicament for the treatment of diseases, comprising mixing a powdered water soluble mercury compound with a local anæsthetic and a fat, then emulsifying a water soluble compound with a solvent and a fat, and then emulsifying the emulsion with the mixture.

3. The process of making a medicament for treatment of diseases, comprising mixing a soluble mercury compound with a local anæsthetic and a fat, then emulsifying a soluble mercury compound dissolved in glycerine with a fat and then emulsifying the emulsion with the mixture.

4. The process of making a medicament for the treatment of diseases, comprising mixing mercury bichlorid with a local anæsthetic and a fat, then emulsifying mercury bichlorid with glycerine and a fat, and then emulsifying the emulsion with the mixture.

5. A composition of matter for the treatment of diseases, comprising a soluble mercury compound, glycerine, a local anæsthetic, and a fat absorbable by the tissues of the human body, the glycerine, compound, and anæsthetic being homogeneously distributed in the fat acting as a retarding agent, whereby the absorption of the soluble mercury compound by the tissues of the body is retarded, to enable the mercury compound to be absorbed by the tissues of the body in unison with the fat.

6. A composition of matter for the treatment of diseases, comprising a soluble mercury compound, a solute therefor, and a fat absorbable by the tissues of the human body, the solute carrying the compound being homogeneously distributed in the fat acting as a retarding agent, whereby the absorption of the soluble mercury compound by the tissues of the body is retarded to enable the mercury compound to be absorbed by the tissues of the body in unison with the fat.

7. A composition of matter for the treatment of diseases, comprising a soluble mercury compound dissolved in glycerine, and a fat absorbable by the tissues of the human body, the dissolved mercury being homogeneously distributed in the fat, whereby an emulsion is formed, and the absorption of the soluble mercury compound by the tissues of the body is retarded by the fat to enable the mercury compound to be absorbed by the tissues of the body in unison with the fat.

In testimony that I claim the foregoing as my invention, I have signed my name.

LLOYD W. CYRENIUS.